(12) United States Patent
Balley et al.

(10) Patent No.: US 7,184,785 B2
(45) Date of Patent: Feb. 27, 2007

(54) METHOD OF ACTIVATING A CAMERA FROM A REMOTE TERMINAL

(75) Inventors: Nicolas Balley, Paris (FR); Gwenaël Le Bodic, Allemagne (DE)

(73) Assignee: Alcatel, Paris (FR)

( * ) Notice: Subject to any disclaimer, the term of this patent is extended or adjusted under 35 U.S.C. 154(b) by 101 days.

(21) Appl. No.: 11/016,856

(22) Filed: Dec. 21, 2004

(65) Prior Publication Data

US 2005/0164696 A1 Jul. 28, 2005

(30) Foreign Application Priority Data

Dec. 23, 2003 (FR) ................... 03 15435

(51) Int. Cl.
*H04Q 7/20* (2006.01)
(52) U.S. Cl. ................ 455/466; 455/414.3; 455/556.1; 455/3.06; 348/14.02; 709/217
(58) Field of Classification Search ............... 455/3.03, 455/3.04, 408, 412.1, 414.3, 419, 420, 556.1, 455/414.1, 3.06, 422.1, 466, 550.1, 557; 348/211.99, 211.1, 211, 14.01–14.05; 709/203, 709/207, 217
See application file for complete search history.

(56) References Cited

U.S. PATENT DOCUMENTS

| | | | | |
|---|---|---|---|---|
| 5,815,194 A | * | 9/1998 | Ueda ........................... 725/100 |
| 6,646,564 B1 | * | 11/2003 | Azieres et al. ............... 340/679 |
| 6,763,226 B1 | * | 7/2004 | McZeal, Jr. ............... 455/550.1 |
| 2003/0017825 A1 | | 1/2003 | De Loye et al. |
| 2003/0050062 A1 | | 3/2003 | Chen et al. |
| 2003/0117497 A1 | * | 6/2003 | Nicolaisen et al. .... 348/207.99 |
| 2003/0137422 A1 | | 7/2003 | Nishibori |
| 2003/0140107 A1 | * | 7/2003 | Rezvani et al. ............. 709/208 |
| 2003/0157960 A1 | * | 8/2003 | Kennedy ..................... 455/556 |
| 2003/0208543 A1 | | 11/2003 | Packard et al. |
| 2005/0073574 A1 | * | 4/2005 | Krisbergh et al. ........ 348/14.01 |
| 2005/0118990 A1 | * | 6/2005 | Stephens .................... 455/418 |
| 2005/0141439 A1 | * | 6/2005 | Hsu et al. .................... 370/259 |
| 2006/0085752 A1 | * | 4/2006 | Beadle et al. ............... 715/751 |
| 2006/0189333 A1 | * | 8/2006 | Othmer ....................... 455/466 |

* cited by examiner

Primary Examiner—Joseph Feild
Assistant Examiner—Kamaran Afshar
(74) Attorney, Agent, or Firm—Sughrue Mion, PLLC

(57) ABSTRACT

Method for activating the camera at a second radiocommunication terminal (3), from a first radiocommunication terminal (1), the first and second terminals (1,3) being located in a radiocommunication network, said first terminal (1) comprising means of sending commands to the second terminal and receiving commands from the second terminal (3), the said first and second terminals (1,3) being connected to an instant messaging service according to the WAP protocol, characterized in that:

the said first terminal (1) sends a command to the second terminal (3), the second terminal (3) receives and analyzes said command, the analysis of said command causes the camera to be activated at the second terminal (3), and at least one image captured by the camera to be recorded in the second terminal (3).

15 Claims, 1 Drawing Sheet

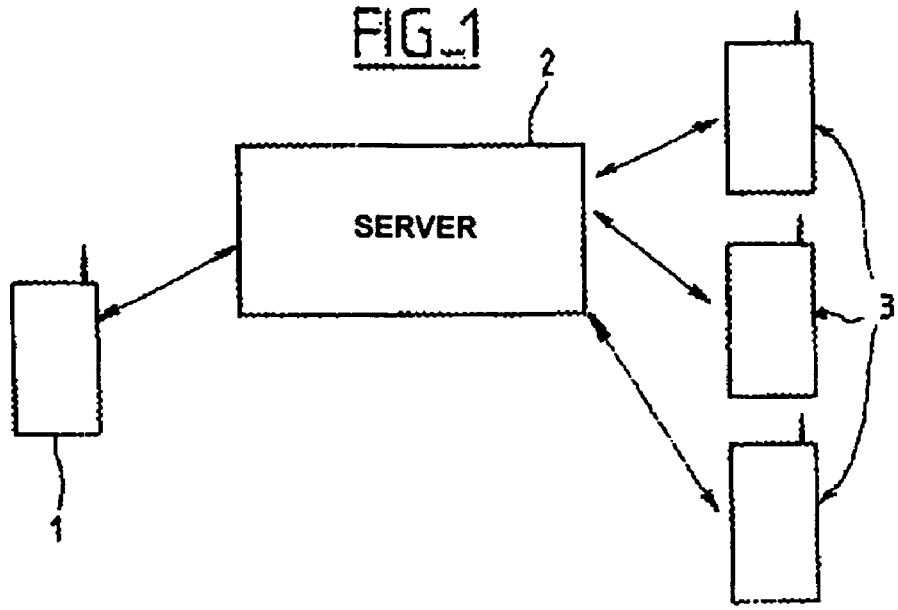
FIG_1
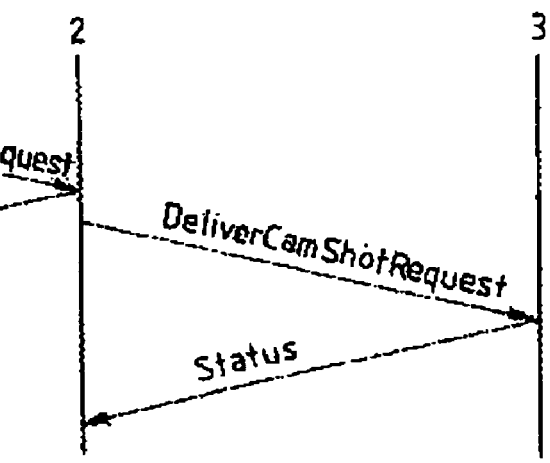
FIG_2
| PRIMITIVE | DIRECTION |
|---|---|
| SendCamShotRequest | 1 → Server 2 |
| Status | Server 2 → 1 |
| DeliverCamShotRequest | Server 2 → 3 |
| Status | 3 → Server 2 |
TABLE 1

METHOD OF ACTIVATING A CAMERA FROM A REMOTE TERMINAL

FIELD OF THE INVENTION

This invention relates to a method of remotely activating a camera in a second radiocommunication terminal, from a first radiocommunication terminal.

One non-exclusive application domain of this invention is mobile radiocommunication terminals operating in a radiocommunication system. The invention is particularly but not exclusively applicable to a system or network according to the GSM (Groupe Systèmes Mobiles—public radiocommunication systems group), DCS, PCS or UMTS standard, or a DECT (Digital European Cordless Telecommunications) type telephone.

BACKGROUND OF THE INVENTION

Radiocommunication systems are used to make verbal communication exchanges, and also to exchange messages in SMS (Short Message Service) format.

A new form of written communications between two radiocommunication terminals is an instantaneous conversation service such as the service known under the term <<instant messaging>>; this service is currently very successful.

This service is based on the WAP (Wireless Application Protocol) transport protocol.

Two radiocommunication terminal users can converse through written messages without needing to indicate an address for each user for each message sent, as is the case with SMSs.

One advantage of "instant messaging" is that more than two users connected to the "instant messaging" can converse at the same time by writing a message without it being necessary to indicate all addresses of each user with each message sent.

Thus, the user can remain in contact with a series of friends recorded in a directory called the buddy list. Messages exchanges between these connected buddies are written in a so-called discussion window.

During a discussion, the user connected to the "instant messaging" may want to take action on the terminal of another user in his buddy list, who is connected to the <<instant messaging>>.

SUMMARY OF THE INVENTION

The purpose of the invention is to provide a solution by which a camera can be activated at a second radiocommunication terminal, from a first radiocommunication terminal.

This invention relates to a method for activating the camera at a second radiocommunication terminal, from a first radiocommunication terminal, the first and second terminals being located in a radiocommunication network, the said first terminal comprising means of sending commands to the second terminal and receiving commands from the second terminal, the said first and second terminals being connected to an instant messaging service according to the WAP protocol, characterized in that:
  the said first terminal sends a command to the second terminal,
  the second terminal receives and analyzes said command,
  the analysis of the command causes the camera to be activated at the second terminal, and at least one image captured by the camera to be recorded in the second terminal.

To achieve this, the invention also relates to a radiocommunication terminal comprising means of sending and receiving commands to and from a second terminal, said terminal and said second terminal being connected to an instant messaging service conform with the WAP protocol, at least said second terminal comprising a camera, characterized in that a command is sent by said terminal to said second terminal, said command is received and analyzed by the second terminal, the analysis of said command activating the camera at the second terminal and recording of at least one image captured by the camera at the second terminal.

In another embodiment, the terminal is characterized in that said recorded image is sent from the second terminal to the first terminal.

Preferably, terminals according to the invention are chosen among the group of mobile radiocommunication terminals, and personal digital assistants.

BRIEF DESCRIPTION OF THE DRAWINGS

Other characteristics and advantages of the invention will become clear after reading the following description of a particular embodiment of the invention, given for illustrative purposes without being limitative, and the drawing mentioned below.

FIG. 1 illustrates a radiocommunication network implementing the invention in the various embodiments.

FIG. 2 and table 1 illustrate the transport protocol according to the invention.

DETAILED DESCRIPTION OF EXEMPLARY EMBODIMENTS OF THE INVENTION

A buddy list of persons wishing to communicate together through instant messaging is firstly recorded in each terminal.

In a first embodiment, the user of the first terminal 1 and at least one other user of a second terminal 3 in FIG. 1 are connected to the instant messaging service.

The user of the first terminal 1 decides to activate the camera on one of the second terminals 3 by sending protocol commands to the second terminal 3 in the instant messaging session.

According to the protocol defined below, the first terminal 1 sends a first command to the radiocommunication system server 2, and the server 2 will then send a second command to the user of the second terminal 3 in the buddy list, to activate the camera on the second terminal 3.

The protocol used between terminals 1 and 3 and server 2 may for example be as follows:

The user of the first terminal 1 sends a first command to the server 2:
  <<SendCamShotRequest >>.

The server 2 returns a reply to the first command from the first terminal 1 to terminal 1 to indicate whether or not it is possible to execute the first command. This reply is sent in a message called a <<status message>>.

The server 2 then sends a second <<DeliverCamShotRequest>> command to the second terminal 3 to activate the camera at the second terminal 3.

The second terminal 3 then returns a reply to the server 2 which consists of an indicator enabling identification of the second command by the second terminal (3). This reply is sent in a message called a <<status message>>.

When the second terminal 3 analyses the second command, the camera is activated and at least the image captured by the camera is recorded at the second terminal 3.

The recorded image is sent from the second terminal 3 to the first terminal 1.

For example, the camera may be activated by taking a photo, a series of photos or a video. The first command may state whether or not the user wants to take a photo, the format of the photo, a series of photos and the time interval between each photo and their format, or a video, and the duration of the video.

The user on the second terminal 3 may also see a predetermined text included in the second <<DeliverCamShotRequest>> command asking him to move captured by the camera lens before the camera is activated.

The user of the second terminal 3 may refuse acceptance of the second <<DeliverCamShotRequest>> command by making a setting. Thus, his terminal will not activate its camera.

In a second embodiment, the user of the first terminal 1 decides to activate the camera on one of the second terminals 3 in his buddy list. The camera is activated in the form of a command included in one of the written instant messages exchanged in the conversation between the user of the first terminal 1 and the user of one of the second terminals 3.

For example, this command to activate the camera of the second terminal 3 and to send the image to the first terminal 1, may be a <<-CC->> type command.

When the second terminal 3 receives the message sent by the first terminal 1, the second terminal 3 analyses the text and the command contained in the message.

The second terminal 3 activates its camera and the camera takes an image, that the second terminal 3 sends to the first terminal 1.

For example, activation of the camera consists of taking a photo, a series of photos or a video. The first command may state whether or not the user wants to take a photo, the format of the photo, a series of photos and the time interval between each photo and their format, or a video and the duration of the video.

All commands described according to the invention satisfy the Wireless Village standard of the Open Mobile Alliance, OMA-IMPS-CSP-V1_1-20021001-A.

The invention claimed is:

1. Method for remotely activating a camera in a wireless radio communication network, the network comprising:
   a first radiocommunication terminal and a second radiocommunication terminal comprising the camera, the first and second terminals being located in the radiocommunication network, the said first terminal comprising means of sending commands to the second terminal and receiving commands from the second terminal, the said first and second terminals being connected to an instant messaging service according to the WAP protocol, characterized in that:
   the said first terminal sends a command to the second terminal,
   the second terminal receives and analyzes said command,
   the analysis of said command causes the camera to be activated at the second terminal, and at least one image captured by the camera to be recorded in the second terminal; and wherein the command is sent from the first terminal to the second terminal over the instant messaging service to activate the camera.

2. Method according to claim 1, characterized in that said recorded image is sent from the second terminal to the first terminal.

3. Method according to claim 2, characterized in that said command is sent to the second terminal through a server located in said radiocommunication network.

4. Method according to claim 1 characterized in that said command is composed of a first command and a second command.

5. Method according to claim 4, characterized in that the first command is sent by the first terminal to the server and the second command is sent from the server to the second terminal.

6. Method according to claim 5, characterized in that the first command is a <<SendCamShotRequest>> type command.

7. Method according to claim 5, characterized in that after the first terminal has sent the first command, the server sends a reply to the first terminal, the said reply indicating that the first command has been executed.

8. Method according to claim 5, characterized in that the second command is a <<DeliverCamShotRequest>> type command.

9. Method according to claim 5, characterized in that after the server has sent the second command, the terminal sends a reply to the server, the said reply indicating that the second command has been identified by the terminal.

10. Method according to claim 1, characterized in that the first terminal sends a message to the second terminal, the said message comprising a non-predetermined text and said command.

11. Method according to claim 1, characterized in that activation of the camera consists of taking a photo or a video.

12. Method according to claim 1, characterized in that the second terminal comprises a setting for disabling execution of the command by the second terminal.

13. Radiocommunication first terminal for use in a wireless communication network, comprising: means of sending commands to a second terminal and receiving commands from the second terminal, the said first and second terminals being connected to an instant messaging service according to the WAP protocol, at least said second terminal comprising a camera, characterized in that a command is sent by said first terminal to the second terminal, the said command is received and analyzed by the second terminal, the analysis of said command activates the camera at the second terminal and records at least one image captured by the camera in the second terminal; and
   wherein the command is sent from the first terminal to the second terminal over the instant messaging service to activate the camera.

14. Terminal according to claim 13, characterized in that said recorded image is sent from the second terminal to the first terminal.

15. A method for remotely activating a camera in a wireless communication network, comprising:
   providing a first radiocommunication terminal;
   providing a second radiocommunication terminal that also comprises the camera;
   recording a buddy list of persons for communication with each using an instant messaging service according to the WAP protocol, the buddy list identifying the first and second radiocommunication terminals;
   recognizing that the second radiocommunication terminal is connected to the instant messaging service;
   sending an activation command from the first radiocommunication terminal over the instant messaging service to the second radiocommunication terminal to activate the camera;
   receiving the activation command at the second radiocommunication terminal;
   activating the camera at the second radiocommunication terminal to capture at least one image based on the activation command.

* * * * *